H. L. BEACH.
MOTOR CONTROL SYSTEM.
APPLICATION FILED JUNE 29, 1914.
1,196,071.
Patented Aug. 29, 1916.
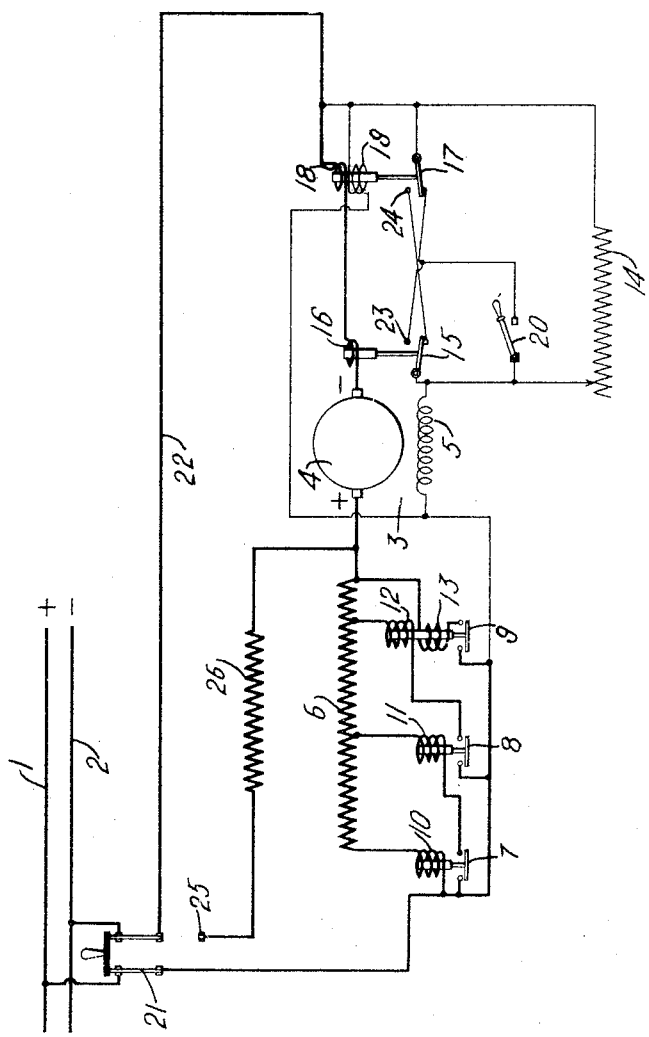
WITNESSES:
Fred A. Lind.
J. R. Langley.
INVENTOR
Howard L. Beach.
BY
Wesley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,196,071.  Specification of Letters Patent.  Patented Aug. 29, 1916.

Application filed June 29, 1914. Serial No. 847,800.

*To all whom it may concern:*

Be it known that I, HOWARD L. BEACH, a citizen of the United States, and a resident of Edgewood Park, in the county of Allegheny and State of Pennsylvania, have invented a new and useful Improvement in Motor-Control Systems, of which the following is a specification.

My invention relates to motor-control systems and particularly to systems embodying means for automatically controlling the acceleration and retardation of electric motors.

My invention has for its object to provide a system of control by means of which a single current-limit device may be employed to automatically effect the acceleration and retardation of an electric motor.

In the operation of motors for driving planers, elevators and similar machinery requiring frequent stops and reversals, it is desirable that a system of control be employed that permits of rapid acceleration in starting and provides means for bringing the motor to a stop quickly and safely. It is desirable to provide a system which is entirely automatic in its operation in order that the loss of time and the attention required in manually operated systems may be avoided.

I provide a system in which a current-limit switch operates to control a field resistor both in accelerating and in retarding the motor. A reverse-current relay switch operates to reverse the functions of the current-limit switch when the motor is accelerated or retarded, respectively.

In the accompanying drawing, the single figure is a diagrammatic view of circuits and apparatus embodying my invention.

Energy is supplied from any suitable source, through line conductors 1 and 2, to an electric motor 3, the armature windings of which are indicated at 4, and which is provided with a shunt field winding 5. A sectional resistor 6, which is connected in series with the armature 4, is controlled by a series of successively actuated electromagnetic switches 7, 8 and 9, which are respectively provided with actuating coils 10, 11 and 12, the coils 11 and 12 being connected in series with the switches 7 and 8, respectively. The switch 9 is provided with a holding coil 13 which operates to maintain the switch in its closed position when the resistor 6 has been entirely short circuited.

A field resistor 14, which is connected in circuit with the shunt field winding 5, is controlled by a current-limit switch 15 that is actuated by a series coil 16. The effect of the current-limit switch, as it is moved to the one or the other of its two positions, is controlled by a reverse-current relay switch 17 that is provided with a series coil 18 and a shunt coil 19 that are wound to oppose each other when the directions of the currents traversing them are the same. A manually operable switch 20 controls a shunt circuit for the resistor 14 during the normal operation of the system, when the switch 17 is in its lower position.

It may be assumed that the various switches occupy their respective positions as illustrated. To start the motor, a main switch 21 is closed, and current flows through a circuit which extends from the line conductor 1, through the switch 21, coil 10, resistor 6, armature 4, coils 16 and 18, conductor 22 and switch 21, to the line conductor 2. Current also flows through a shunt circuit comprising the shunt field winding 5 and the resistor 14. The coil 10 will be energized to close the switch 7 and thereby complete a short circuit through the coil 11 for one section of the resistor 6. The coil 11 will then be energized to close the switch 8 to complete a short circuit through the coil 12 for a second section of the resistor 6. When the switch 9 closes, a short circuit for the entire resistor 6 is established through the holding coil 13, thus insuring that the switch 9 will remain closed as long as the current traversing it exceeds a predetermined value.

When the motor is being accelerated, the switch 17 is in its closed position, as illustrated, because current flows through the oppositely wound coils 18 and 19 in the same direction. In this position of the switch 17, the shunt circuit for the resistor 14 is completed when the switch 15 is actuated to its upper position, upon an excessive current traversing the coil 16. As long as the armature current does not rise above a predetermined value, the switch 15 remains in its lower position, and the resistor 14 is in series with the shunt field winding 5. When

resistor comprising a current-limit switch and a reverse-current relay switch so connected that the actuation of one of said switches operates to reverse the function of the other.

3. In a motor-control system, the combination with an electric motor having a shunt field magnet winding and a resistor in circuit with said winding, of a current-limit switch for controlling a shunt circuit for said resistor, and means comprising a double-throw reverse-current relay switch in said circuit for controlling the functions of said current-limit switch.

4. In a motor-control system, the combination with an electric motor and a field resistor therefor, of a shunt circuit for said resistor comprising a current-limit switch and a reverse-current relay switch so connected that the actuation of each of said switches operates to reverse the function of the other.

5. In a motor-control system, the combination with an electric motor having a field magnet winding, and a resistor in circuit with said winding, of a current-limit switch for controlling a shunt circuit for said resistor, and a reverse-current relay switch in the shunt circuit which operates, according to its position, to cause the current-limit switch to respectively open and close said shunt circuit when said current-limit switch is in its normal position.

In testimony whereof, I have hereunto subscribed my name this 24th day of June, 1914.

HOWARD L. BEACH.

Witnesses:
A. Brunt,
B. B. Hines.

Copies of this patent may be obtained for five cents each, by addressing the "Commissioner of Patents, Washington, D. C."